United States Patent

[11] 3,620,574

| [72] | Inventors | Paul D. Cox |
| | | Ridgeville, Ind. 47380; |
| | | Joseph J. Matchett, Dunkirk, Ind. |
| [21] | Appl. No. | 818,753 |
| [22] | Filed | Apr. 23, 1969 |
| [45] | Patented | Nov. 16, 1971 |
| [73] | Assignee | |
| | | said Cox, by said Matchett |

[54] LUG LOCK
2 Claims, 5 Drawing Figs.

| [52] | U.S. Cl. | 301/9 DN, 151/49 |
| [51] | Int. Cl. | B60b 3/16 |
| [50] | Field of Search | 301/9 DN; 85/32.5; 151/47, 49, 51, 52, 50, 44 |

[56] References Cited
UNITED STATES PATENTS

| 463,650 | 11/1891 | Stevens | 151/49 |
| 1,301,958 | 4/1919 | Mendenhall | 85/32 (.5) |
| 2,591,631 | 4/1952 | Stanitski | 301/9 |
| 2,626,837 | 1/1953 | Wilson | 301/9 |
| 2,758,628 | 8/1956 | Rice | 301/9 X |
| 2,798,770 | 7/1957 | Terrick | 301/9 |
| 866,279 | 9/1907 | Jenkins | 151/44 |

*Primary Examiner*—Richard J. Johnson
*Attorney*—Hood, Gust, Irish & Lundy

ABSTRACT: For use with a lug utilized to secure a wheel rim to a wheel hub, means for locking the lug against rotation in a direction tending to loosen it, the locking means comprising an element proportioned and designed to engage such a lug in such a manner as to be held against rotation relative thereto, and spring means connected to the element and arranged, when the element is so engaging such a lug, to engage an abutment, such as the sleever portion of the wheel hub. The preferred element is a collar proportioned and designed to slip axially over such a lug and snugly to engage at least one flat side thereof. The preferred spring means is an elongated, stiff, wirelike member securely attached, at its proximal end, to the element, the distal end portion of the member being arranged to engage the abutment.

INVENTORS
PAUL D. COX
JOSEPH J. MATCHETT
by Hood, Gust, Irish & Lundy
Attorneys

INVENTORS
PAUL D. COX
JOSEPH J. MATCHETT
by Hood, Gust, Irish & Lundy
Attorneys

LUG LOCK

BACKGROUND OF THE INVENTION

Field of the Invention

The present invention relates to automotive wheel lugs, and more particularly to the provision of means for locking such lugs against rotation in a direction tending to loosen them.

SUMMARY OF THE INVENTION

The locking means of the present invention comprises an element proportioned and designed to engage a conventional wheel lug in such a manner as to be held against rotation relative thereto and spring means connected to the element and arranged, when the element is so engaging such a lug, to engage any rigid abutment adjacent the lug, whereby the spring means is biased in a direction tending to tighten the lug.

Conventionally, each wheel lug has a conically tapered axially inner portion which concentrically penetrates a circular opening formed in the rim, thereby to position the rim relative to the hub. In the preferred embodiment of the present invention, when locking means is placed on such a lug, the spring means of the locking means yieldingly engages the tapered portion of the lug to prevent or to resist movement of the locking means axially off the lug. Specifically, the preferred locking means comprises a collarlike element proportional and designed to slip axially over such a lug and snugly to engage at least one flat side thereof and the preferred spring means is a stiff, wirelike member extending through peripherally spaced apart openings in the collarlike element to engage the reduced or tapered portion of the lug on which the element is disposed. Further, at least one of the openings through which the spring member extends is peripherally elongated to provide for radially directed flexural movement of the portion of the spring member extending therethrough.

It will be appreciated, as this description progresses, that, while conventional wheel lugs are illustrated and described, the locking means of the present invention will prevent rotation of any threaded fastening element in a direction which will tend to loosen the element. For instance, the illustrated locking means may be used to prevent or to resist rotation of a hexagonal-headed bolt. Thus, in this description and in the claims appended hereto, the term "lug" is intended to include any threaded fastening element such as a multisided nut or a multisided headed bolt used to secure a first member to a second member as well as conventional automotive wheel lugs. Further, in this description and in the claims appended hereto, the term "abutment" is intended to mean any rigid body or element against which the spring means of the locking means can be abutted. For instance, in the automotive wheel application, the spring means of the locking means may be engaged with the centrally located sleeve portion of the hub or with another lug utilized to hold the rim of the hub.

It is an object of the present invention, therefore, to provide means for locking a lug against rotation in a direction tending to loosen it, the locking means being simple in construction, but, yet, effective for the purpose intended.

Another object of the present invention is to provide such a locking means which can be easily installed with a simple and readily available pair of pliers.

The above-mentioned and other features and objects of this invention and the manner of attaining them will become more apparent and the invention itself will be best understood by reference to the following description of an embodiment of the invention taken in conjunction with the accompanying drawings wherein:

DESCRIPTION OF THE PREFERRED EMBODIMENT

Figure 1:
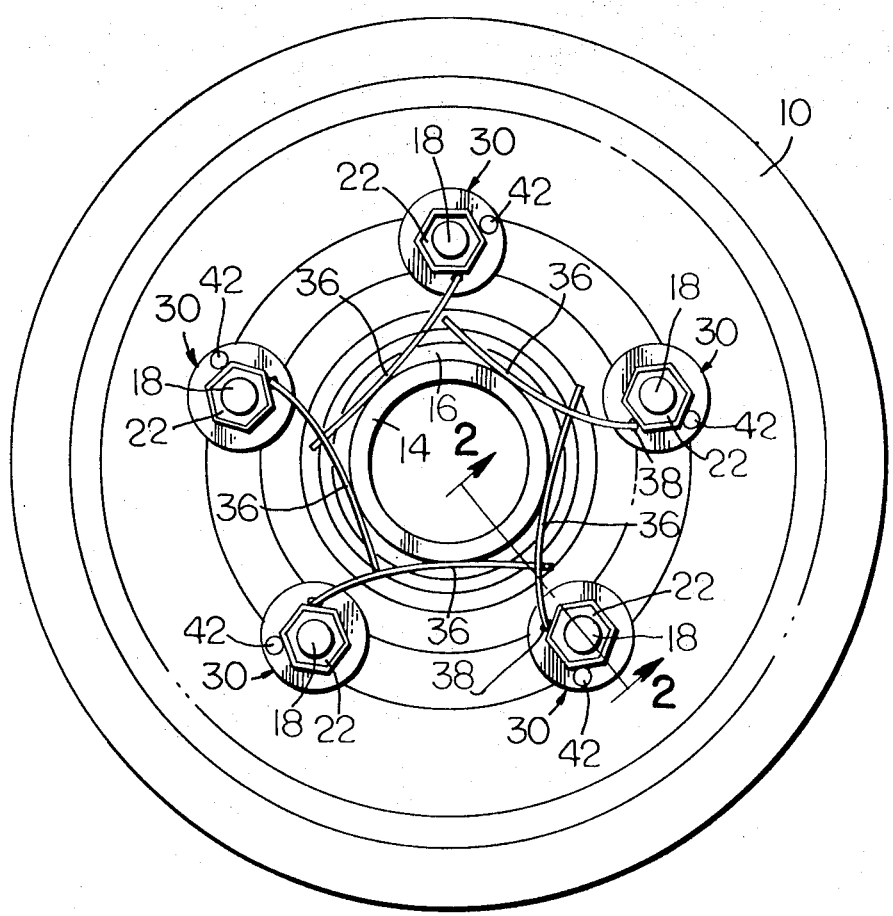
FIG. 1 is an elevational view showing the inner portion of a wheel rim mounted on a hub and secured thereto by means of lugs and with one locking means of the present invention mounted on each lug.
Figure 2:
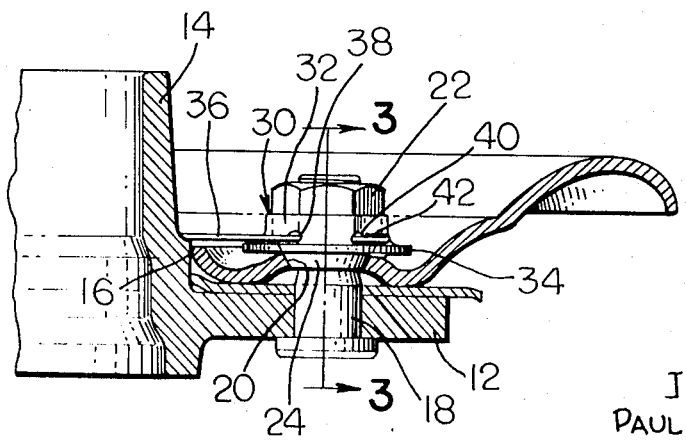
FIG. 2 is a fragmentary, slightly enlarged, sectional view taken from FIG. 1 generally along the line 2—2.
Figure 3:
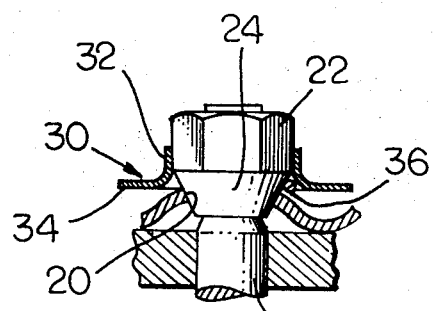
FIG. 3 is a fragmentary sectional view taken from FIG. 2 generally along the line 3—3.

Referring now to FIGS. 1, 2 and 3, it will be seen that there is illustrated the inner portion of a conventional wheel rim 10 mounted on a conventional hub 12 provided with a centrally located, axially extending sleeve portion 14 which extends through a centrally located opening 16 in the rim portion. Conventionally, a plurality of peripherally spaced-apart studs 18 are rigidly fastened to the hub 12 to extend axially therefrom through registering openings 20 in the rim portion 10. Also, conventionally, a lug 22 is threadedly engaged on each stud 18 to hold the rim portion 10 to the hub 12, each lug 22 having an axially inner tapered portion 24 arranged concentrically to penetrate the opening 20 about the stud 18 on which the lug 22 is threaded.

It will be appreciated that the rim portion 10, hub 12, studs 18 and lugs 22 are conventional. Thus, the structures of these elements need not be discussed in greater detail herein.

It is an object of the present invention to prevent lugs, such as the lugs 22, from working free, i.e., rotating in a direction which will loosen the lugs 22 on their respective studs 18, so that the rim portion 10 can separate from the hub 12. Specifically, road vibrations may tend to cause the lugs 22 (FIG. 1) to rotate in a counterclockwise direction on their respective studs 18. Such counterclockwise rotation will loosen the lugs 22.

Figure 4:
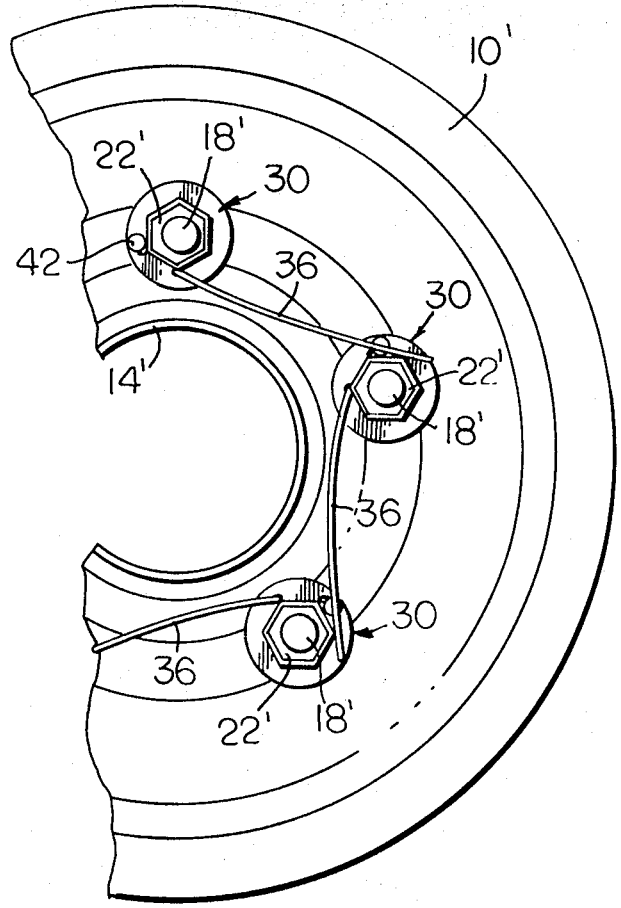
FIG. 4 is a fragmentary elevational view similar to FIG. 1 except that the locking means are adapted for use with lugs having left-hand threads.
Figure 5:
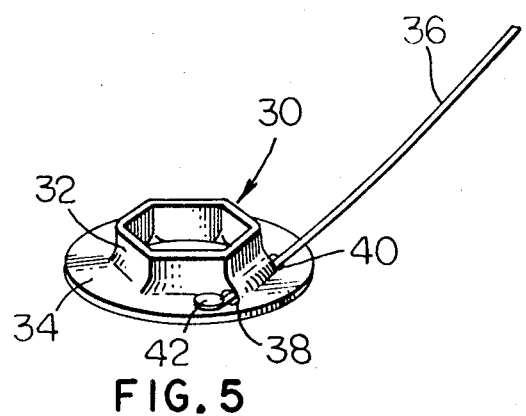
FIG. 5 is a perspective view of the locking means of the present invention.

Thus, the present invention comprises a locking means or locking device 30 associated with each lug 22 and arranged to prevent rotation of the lug in a direction which will tend to loosen it on its stud 18. The locking devices 30 in FIGS. 1, 2 and 3, are adapted for use with lugs having right-hand threads while the locking devices 30 in FIGS. 4 and 5 are adapted for use with lugs having left-hand threads. Each locking device 30 comprises a collar 32 proportioned and designed to slip axially over a lug 22 and to engage snugly each flat side thereof. Thus, when a collar 32 is placed over a lug 22, there can be no relative rotation between the lug and the collar. It will be appreciated that relative rotation between a collar 32 and a lug 22 will be prevented if, for instance, only one flat side of the lug is snugly engaged by the collar mounted thereon. It is, therefore, merely a matter of convenience to provide a hexagonally shaped collar for receiving a hexagonally shaped lug.

It will be seen that the axially inner end of each collar 32 is provided with a peripherally and radially outwardly extending flange 34 which facilitates the installation of the device 30 and which provides a convenient point at which one end of a stiff, wirelike spring 36 can be connected. The spring lies generally in a plane which is perpendicular to the axis of the collar. The collar 32 is also provided with a pair of peripherally spaced-apart openings 38, 40 adjacent the flange 34 and through which the spring 36 extends. The proximal end of the spring 36 is rigidly connected to the flange 34 by means such as the illustrated rivet 42. It will be appreciated that this proximal end of the spring 36 may be spotwelded or otherwise securely fastened to the flange 34.

Preferably, each of these openings 38, 40 is peripherally elongated to provide for radially directed flexural movement of the portion of the spring 36 extending therethrough. Further, for reasons which will be explained hereinafter, preferably the openings 38 and 40 are symmetrically disposed relative to one flat side of the collar 32 and identical in size. That is, practically, it is only necessary that the opening 38, 40 which is remote from the point 42 at which the proximal end of the spring 36 is connected to the flange 34 be peripherally elongated to accommodate the flexural movement of the spring. The opening 40 is the remote opening when the device is for use with left-hand threaded lugs and the opening 38 is the remote opening when the device is for use with right-hand threaded lugs.

The two openings 38 and 40 and the spring 36 are arranged so that, when the spring is tensioned against an abutment as hereinafter described, the spring will extend inwardly through the collar to engage the lug 22 on which the device 30 is mounted. Thus, when a device 30 is placed on a lug 22 and spring 36 is tensioned against sleeve portion 14, as illustrated in FIGS. 1,2 and 3, the spring 36 will resiliently engage the axially inner tapered portion 24 of the lug to resist axially outward movement of the device, thus providing detent means for retaining the device on the lug.

As viewed in FIG. 1, the distal end portions of the springs 36 engage the sleeve portion 14 so that each spring 36 is biased in a direction which tends to rotate its associated collar 32 in a clockwise direction. Thus, each device 30 on a lug 22 comprises spring means which engage the sleeve portion 14 and which tends to rotate the lug 22 on which the device is mounted in a clockwise direction.

The locking devices 30 are installed by slipping them over a lug 22 (FIG. 1) which has already been tightened. In order to get the collar 32 of the device on a lug 22, it is necessary to place a tension on the spring 36 of the device which engages the sleeve portion 14 of the hub 12. This may be accomplished by means of conventional pliers with the jaws of the pliers engaging the exterior of the collar 32 and abutting the flange 34 so that the collar can be rotated relative to the lug on which it is to be placed to place a tension on the spring 36 and so that, once the collar is in registry with the lug, the jaws of the pliers can be pushed against the flange to force the collar onto the lug.

The locking device 30 of FIG. 5 is arranged for use on lugs having left-hand threads. That is, the spring 36 of the device 30 of FIG. 5 is arranged to urge the device and the lug on which it is placed in a counterclockwise direction. Referring to FIG. 4, it will be seen that there is a rim portion 10' mounted on a hub having a sleeve portion 14' and secured thereto by means of lugs 22' which are threaded, respectively, on studs 18'. The lugs 22' and studs 18' are threaded so that counterclockwise rotation of the lugs as viewed in FIG. 4 tends to tighten the lugs. Thus, the springs 36 of the locking devices 30 mounted, respectively, on the lugs 22' are biased to tend to rotate the lugs in the counterclockwise direction.

FUrther, it will be seen that, in FIG. 4, each of the springs 36 engage an adjacent lug 22' or, more specifically, the locking device 30 mounted on the adjacent lug. That is, the springs may engage the lugs instead of the sleeve portion 14' as discussed in conjunction with FIG. 1. In fact, the springs 36 may engage any abutment as discussed previously.

It will be appreciated that the collar 32 and flange 34 may be formed by a conventional metal-forming process from a flat metal disc. The openings 38, 40 may be formed by conventional metal-forming processes. The device 30 of FIG. 5 is adapted for use with left-hand threaded lugs because the end of the spring 36 is rigidly attached to the flange 34 adjacent the opening 38. The devices of FIGS. 1,2 and 3 are adapted for right-hand threaded lugs because the ends of the springs 36 are rigidly connected to their respective flanges 34 adjacent the opening 40. Thus, the same collar 32 and flange 34 can be made either left-handed or right-handed depending on the manner in which the spring 36 is connected thereto.

The spring 36 and openings 38 and 40 are arranged so that the spring can always be stressed or flexed when a device 30 is placed on a lug 22 regardless of the rotational position of the lug. In other words, if the collar 32 slips easily over a lug 22 without placing a stress on the spring attached to the collar, the collar can be rotated approximately 60 degrees to place a stress on the spring before the collar is slipped over the lug.

It will now be seen that when the locking devices of the invention are positioned on the respective lugs, with the springs tensioned against the hub, an adjacent lug, or some other abutment, not only are the lugs positively prevented from working free and falling off the studs, but also engagement of the springs with the tapered portion of the lugs positively retains the locking devices on the lugs.

What is claimed is:

1. For use with a conventional automotive wheel lug for holding a wheel rim on a wheel hub, one of the wheel rim and hub providing an abutment disposed to be adjacent the lug, the lug having a conventional axially inner portion which is tapered concentrically to penetrate a circular opening in the rim, a locking device for locking said lug against rotation, tending to loosen it, comprising a collar proportioned and designed to slip axially over such a lug and to engage snugly at least one flat side thereof, said collar being provided with a peripherally and radially outwardly extending flange at its axially inner end, said collar further being provided with a pair of peripherally spaced-apart openings adjacent its axially inner end, and spring means including a stiff, elongated wirelike member extending through said openings and arranged yieldingly to engage the tapered portion of such a lug on which said collar is disposed, the proximal end of said member being rigidly fastened to the axially outer surface of said flange, and the distal end portion of said member being arranged to resiliently engage such an abutment, whereby said spring means is biased in a direction tending to tighten such a lug.

2. The invention of claim 1 in which the opening remote from the proximal end of said member is generally peripherally elongated to provide for radially directed flexural movement of the portion of said member extending therethrough.

* * * * *